United States Patent
Kuzmic et al.

(10) Patent No.: US 11,261,926 B1
(45) Date of Patent: Mar. 1, 2022

(54) BRAKE CALIPER TOOL

(71) Applicant: A & E INCORPORATED, Racine, WI (US)

(72) Inventors: Jeffrey J Kuzmic, Wind Lake, WI (US); Billy Greuel, Waterford, WI (US)

(*) Notice: Subject to any disclaimer, the term of this patent is extended or adjusted under 35 U.S.C. 154(b) by 0 days.

(21) Appl. No.: 17/094,166

(22) Filed: Nov. 10, 2020

(51) Int. Cl.
  F16D 65/00 (2006.01)
  B25B 27/00 (2006.01)
  B25B 27/02 (2006.01)

(52) U.S. Cl.
  CPC ...... *F16D 65/0043* (2013.01); *B25B 27/0035* (2013.01); *B25B 27/023* (2013.01); *Y10T 29/53796* (2015.01)

(58) Field of Classification Search
  CPC ............. B25B 27/023; Y10T 29/53648; Y10T 29/53683; Y10T 29/53796; Y10T 29/53848; Y10T 29/53891
  USPC ............. 29/244, 252, 255, 278, 239, 271.29
  See application file for complete search history.

(56) References Cited

U.S. PATENT DOCUMENTS

| | | | |
|---|---|---|---|
| 1,339,448 A | 5/1920 | Forsman et al. | |
| 2,170,535 A | 8/1939 | Marsden | |
| 3,835,522 A * | 9/1974 | Ward | B60T 17/221 29/239 |
| 5,018,261 A | 5/1991 | Markous | |
| 5,269,053 A | 12/1993 | Hicks | |
| 5,829,739 A | 11/1998 | Hofmann | |
| 6,085,398 A | 7/2000 | Arch | |
| 6,192,566 B1 | 2/2001 | Dunum | |
| D457,795 S | 5/2002 | Mohammed et al. | |
| 6,574,846 B1 | 6/2003 | Kang | |
| 7,155,792 B1 | 1/2007 | Miler, Jr. | |
| 7,996,972 B2 | 8/2011 | Hu | |
| 8,393,063 B2 | 3/2013 | Hodges et al. | |
| 8,640,316 B2 * | 2/2014 | Gentner | B25B 27/0035 29/257 |
| 8,826,504 B1 | 8/2014 | Siivon | |
| 10,156,273 B1 * | 12/2018 | Huang | F16D 65/0043 |
| 10,371,220 B2 | 8/2019 | Wu | |
| 10,807,220 B2 | 10/2020 | Hernandez, Jr. et al. | |
| 10,821,956 B2 | 11/2020 | Obal | |
| 11,067,142 B2 * | 7/2021 | Tseng | B25B 27/0035 |
| 2004/0123438 A1 * | 7/2004 | Kang | B25B 27/0021 29/239 |
| 2004/0134052 A1 | 7/2004 | Ploeger et al. | |
| 2012/0204393 A1 | 8/2012 | Gentner et al. | |
| 2018/0335097 A1 * | 11/2018 | Dahl | B25B 27/0035 |
| 2019/0076997 A1 * | 3/2019 | Hernandez, Jr. | B25B 27/0035 |
| 2020/0063768 A1 * | 2/2020 | Wu | B25B 27/0021 |

* cited by examiner

Primary Examiner — Tyrone V Hall, Jr.
Assistant Examiner — Jason Khalil Hawkins
(74) Attorney, Agent, or Firm — Nyan Kromholz & Manion, S.C.

(57) ABSTRACT

A tool for retracting pistons into cylinder bores is disclosed. Plates of the present invention are locked by a key to prevent the plates from spinning independently. Additionally, the key acts as an internal stop, providing a point beyond which the plates cannot be further spread or separated from one another. Additionally, a spring is provided to prevent the thread from turning independently from the plates.

4 Claims, 4 Drawing Sheets

BRAKE CALIPER TOOL

BACKGROUND OF THE INVENTION

In the repair of vehicle braking systems having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a vehicle operator activates a foot brake or a handle brake, brake fluid is forced from a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder (s) after which the brake pads can be replaced. The caliper housing can then be reinstalled in the wheel assembly and positioned with the new brake pads adequately accommodated in the caliper housing for engagement with the rotor.

A variety of spreader and brake press tools are known to be used by mechanics responsible for the repair of disc brakes and the replacement of brake pads. A difficulty with these tools, however, as the manual effort often required to effect retraction of the one or more pistons associated with the caliper housing. Accordingly, there remains a need in servicing brake pads to provide a tool for effectively retracting the one or more pistons of various caliper housing designs with improved mechanical advantage and ease of use.

SUMMARY OF THE INVENTION

The present disclosure relates to a disc brake piston retractor tool for retracting at least one piston into at least one cylinder bore of a caliper assembly provided with a set of brake pads to be serviced.

Plates of the present invention are locked by a key to prevent the plates from spinning independently. Additionally, the keying mechanism acts as an internal stop, providing a point beyond which the plates cannot be further spread or separated from one another. Additionally, a spring is provided to create an axial load between the threaded stud and the internal thread on the ratcheting wheel. This load restricts the wrench wheel from turning backwards while retracting the wrench.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
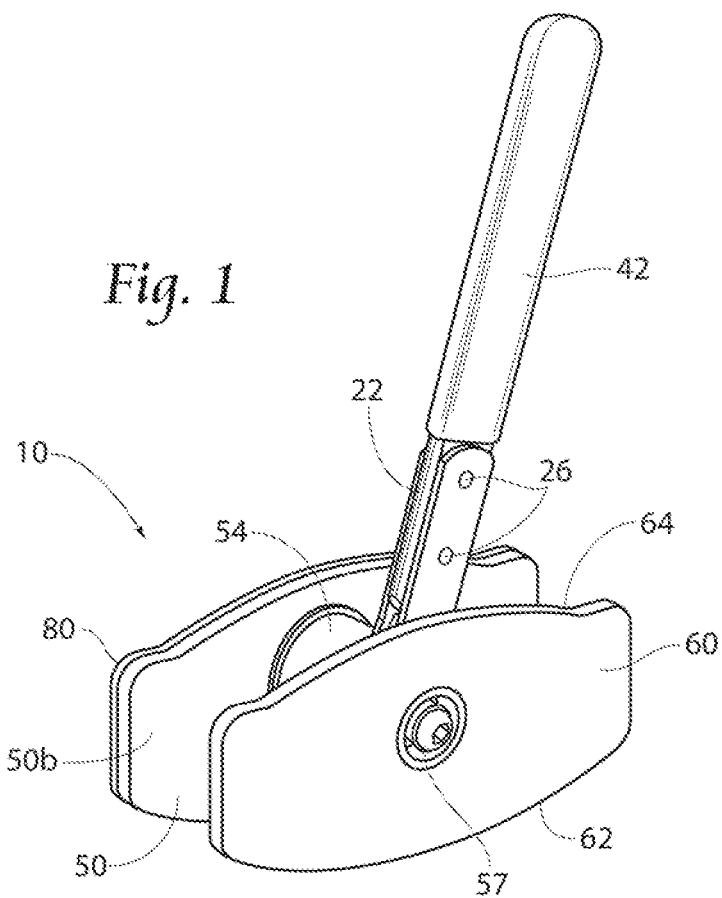
FIG. 1 is a perspective view of portions a disc brake caliper tool according to the present invention.

Referring now to FIG. 1, a disc brake piston retractor tool 10 used for compressing one or more pistons into a caliper housing when replacing a set of brake pads installed therein is shown. A pair of plates 50, 60, are operably spread and retracted by operating ratchet handle 42, carried by spacer 22. A third plate 80 is coupled to first plate 50. A first contoured plate edge 62 and a second contoured plate edge 64 are present on plates 50, 60 and 80.

Referring now particularly to plate 50, plate 50 has two sides, 50a (see FIG. 4) and 50b. Side 50b carries spacer nut 54, and side 50a carries plate 80. The pressure plates 50, 60, and 80 are substantially identical in shape and of similar thickness and are preferably constructed of steel. Threaded screw nut 57 secures a threaded stud 58 (see FIG. 4) to plate 80.

Figure 2:
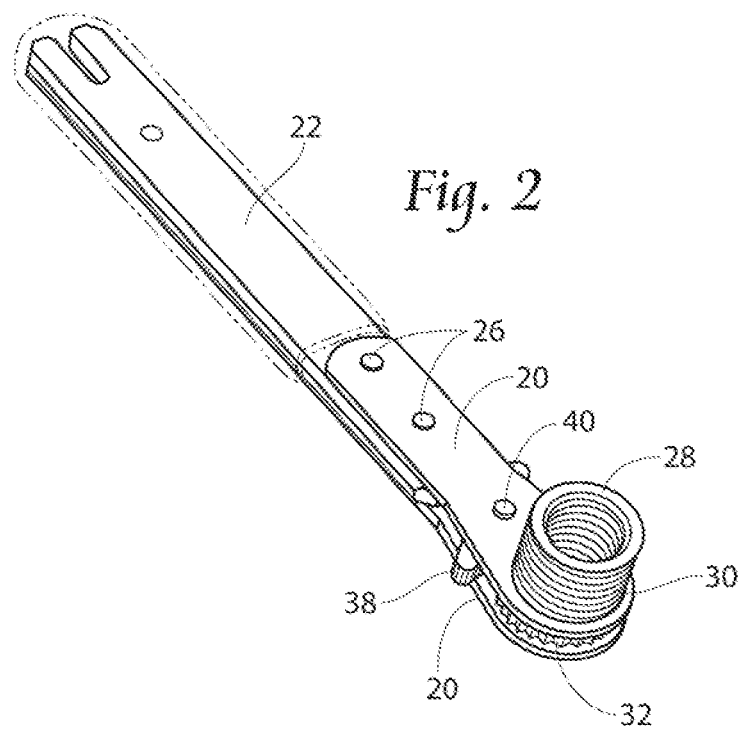
FIG. 2 is an perspective view of portions of the brake caliper tool of FIG. 1.
Figure 3:
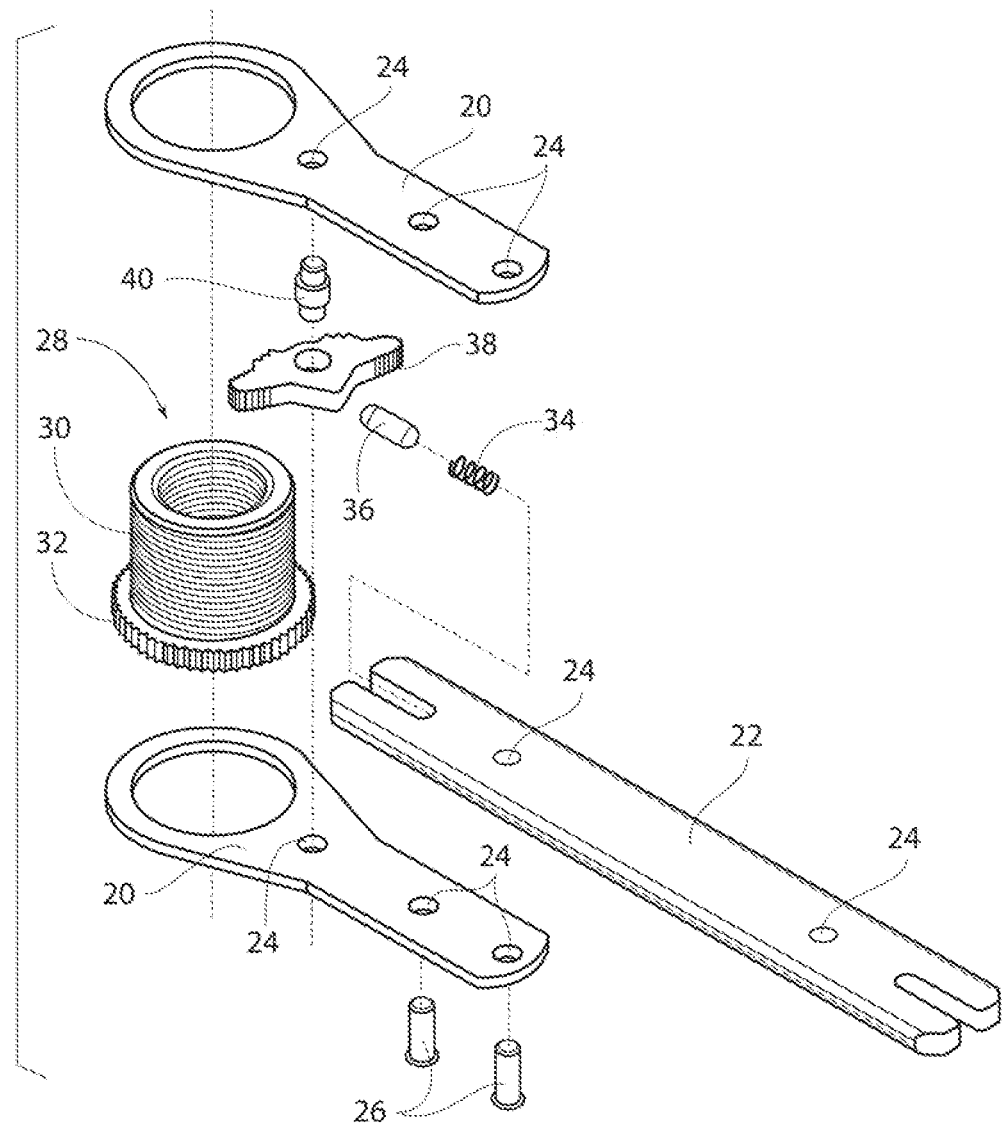
FIG. 3 is a perspective view of a fully assembled disc brake caliper tool according to the present invention.

Referring now to FIGS. 2 and 3, the tool 10 is generally constructed of a spacer 22 carrying a pair of tool plates 20 by rivets 26 interconnected by rivet holes 24. A reversible and extended pawl 38 is coupled via a rivet shoulder 40 between spacer flats 20. A fine tooth ring 32, for engaging the pawl 38, is also carried between tool flats 20 by rivet shoulder 40. Spring coil 34 and pin plunger 36 react between the pawl 38 and the teeth 32. One of the tool flats 20 carries a threaded member 28 comprising threads 30. Fine teeth 32 on an outer surface of the threaded member 28 interact with the pawl 38 and control advancing and retracting of the plates 50, 80 and 60, and pawl 38 can be switched in position to control direction, as is known in the art.

Figure 4:
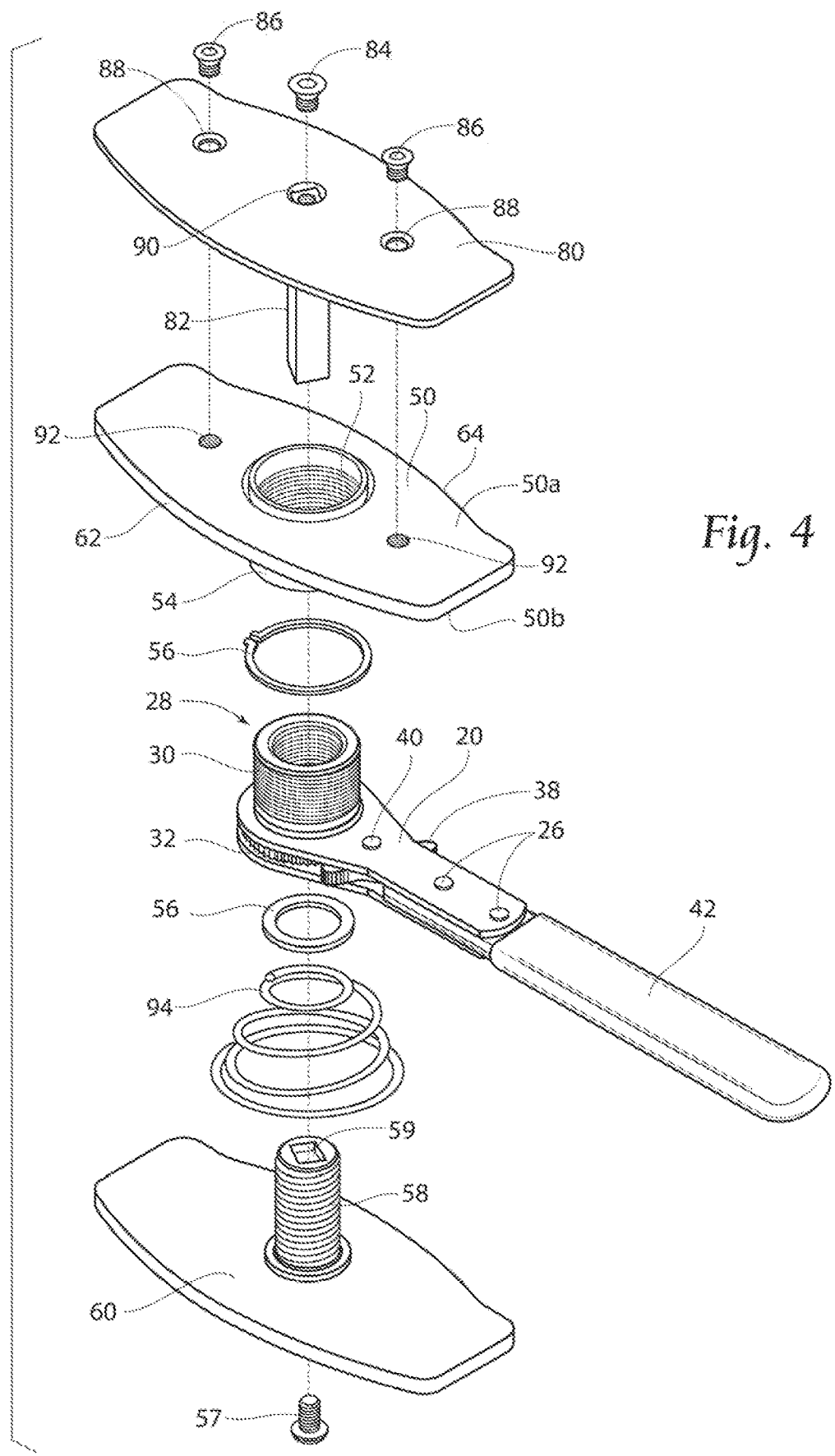
FIG. 4 is an exploded view of the tool shown in FIG. 3.

Referring now to FIG. 4, side 50b of first pressure plate 50 carries spacer nut 54 with internal threads 52, for coupling with threads 30 of ring 28. A pair of washers 56 are provided for spacing. Carried by plate 60, an exterior threaded stud 58 threads through spring 94, washers 56, engages interior threads of member 28.

The reversible ratchet wrench assembly shown is operated similarly to that shown in U.S. Pat. No. 8,826,504, incorporated herein by reference. Handle 42 can rotationally move to advance or retract plates 50 and 60 (and 80) relative to one another, depending on pawl 38 position.

Additionally, spring 94 is provided to prevent the thread 30 from turning independently from the plates 50, 60 and 80. In this manner, handle 42 is dissuaded from rotating independently of user manipulation of the handle 42, e.g., by gravity when the tool is not being held by handle 42. Additionally, spring 94 is provided to create an axial load between the threaded stud 58 and the internal threads on the ratcheting wheel 28. This load restricts the wrench wheel from turning backwards while retracting the wrench.

As the ratcheting mechanism spreads plates 50, 80 and 60, key 82 along with screw 57 provides a dead stop, past which the plates 50 and 60 cannot be separated further, as will be described in relation to FIGS. 5*a* and 5*b*. Plates 50, 60 and 80 are locked in relation to one another by key 82 to prevent the plates from spinning independently of one another.

In a preferred embodiment, plates 50 and 80 are coupled to one another by plate nuts 86 inserted through plate nut voids 88. Female threaded plate nut receivers 92 and plate 50 receive plate nuts 86 and couple plate 80 to plate 50. Alternatively, plates 50 and 80 can be welded to one another.

Key nut 94 is coupled to female threaded plate not receiver 90 at a proximal end of key 82. Alternatively, key 82 can be welded to plate 80. Key 82 is coupled to exterior threaded stud 58 by keyhole 59 and threaded stud nut 57 is coupled to a distal end of key 82. In a preferred embodiment, key 82 is square or rectangular in shape, in order to prevent rotation of plates 50 and 80 relative to plate 60, as key 82 is engaged with key hole 59.

Figure 5A:
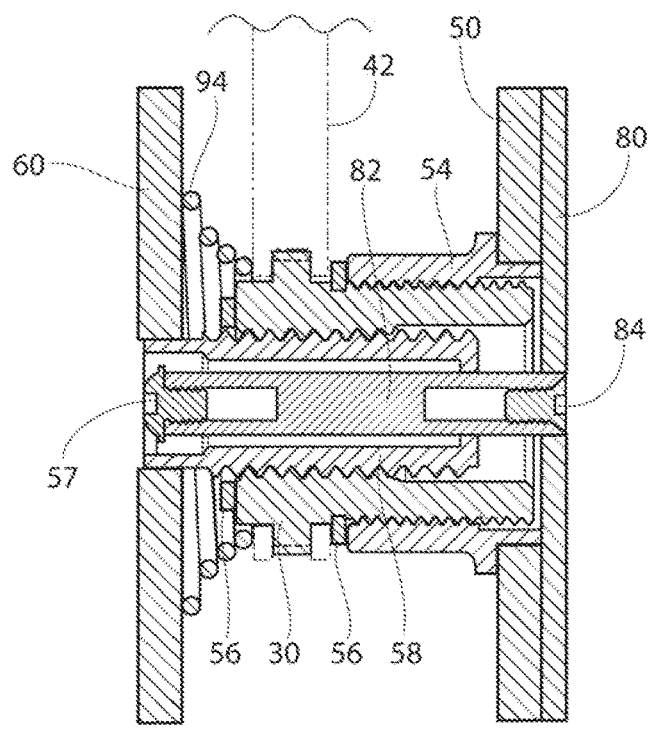
FIG. 5a is a cross sectional view of the tool shown in FIG. 4, with the first and second plates in a closest separated position.

Referring now to FIG. 5*a*, a cross sectional view of the tool shown in FIG. 4 is shown, with the first and second plates in a closest separated position.

Figure 5B:
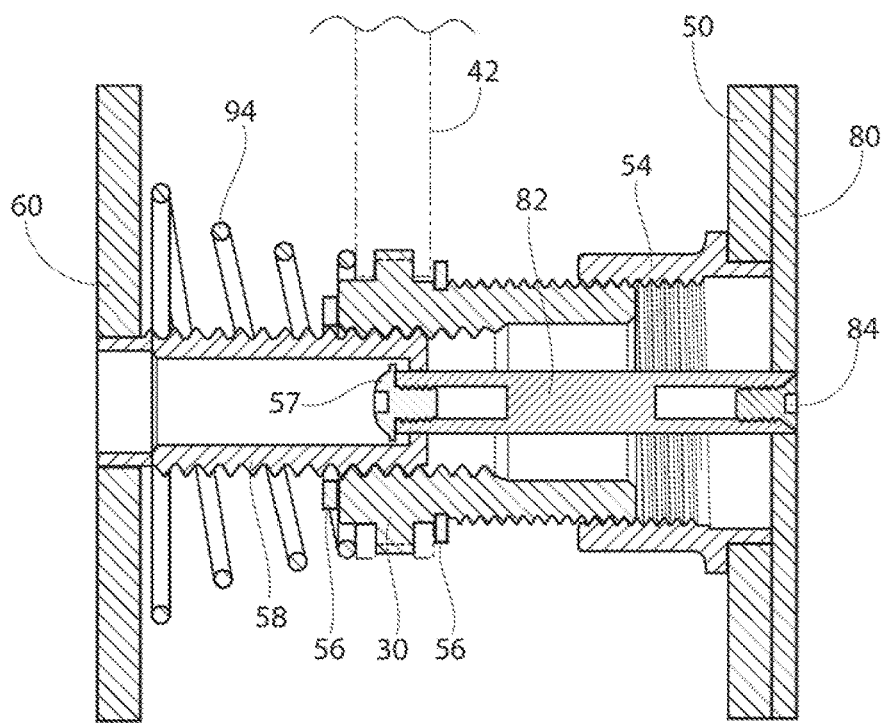
FIG. 5b is a cross sectional view of the tool shown in FIG. 4, with the first and second plates in a farthest separated position.

Referring now to FIG. 5*b*, a cross sectional view of the tool shown in FIG. 5*a*, with the first and second plates in a farthest separated position. In this position, key 82 carrying threaded stud nut 57 acts as a stop against an interior portion of exterior threaded stud 58, thus preventing further spreading of plates 50 and 80 relative to plate 60.

Although not illustrated, it should be understood that certain caliper housings are designed with one set of pistons on one wall, and another set of pistons on another wall spaced from the one wall so that the sets of pistons are spaced apart and face each other. In this case, the tool 10 is placed in the caliper housing such that one pressure plate 50 or 60 is designed to push against and retract the one set of pistons into their respective cylinder bores, and the other pressure plate is designed to push against and retract the other set of pistons into their respective cylinder bores.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A disc brake piston retractor tool for retracting at least one piston into at least one cylinder bore of a caliper assembly provided with a set of brake pads to be serviced, the tool comprising a first and a second pressure plate coupled by a threaded stud received by an interior threaded member, and a key extending through said interior threaded member and coupled to said threaded stud that allows separation of said first and second plate without rotation of said first plate relative to said second plate.

2. The disc brake piston retractor tool according to claim 1, said tool further comprising a third plate coupled to said first plate.

3. The disc brake piston retractor tool according to claim 1, said key carried by a keyhole, said keyhole within the threaded stud, said threaded stud carried by said second plate.

4. The disc brake piston retractor tool according to claim 1, said tool further comprising a spring positioned between said first and second plates.

\* \* \* \* \*